(12) United States Patent
Sakajiri

(10) Patent No.: US 6,442,404 B1
(45) Date of Patent: Aug. 27, 2002

(54) PORTABLE TELEPHONE

(75) Inventor: Noriyasu Sakajiri, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/384,115

(22) Filed: Aug. 26, 1999

(30) Foreign Application Priority Data

Aug. 28, 1998 (JP) .......................... 10-242744

(51) Int. Cl.⁷ .............................. H04B 1/38
(52) U.S. Cl. ................. 455/557; 455/412; 455/345
(58) Field of Search ................ 455/552, 553, 455/556, 557, 412, 413, 414, 415, 417, 344, 345, 445, 560, 566–569, 90, 422, 575; 370/352, 353, 354; 379/93.01, 93.09, 93.24, 902; 358/441, 442, 443, 444, 468

(56) References Cited

U.S. PATENT DOCUMENTS

| | | | | |
|---|---|---|---|---|
| 4,823,373 A | * | 4/1989 | Takahashi et al. | 455/553 |
| 5,559,860 A | | 9/1996 | Mizikovsky | |
| 5,715,302 A | * | 2/1998 | Lee | 358/468 |
| 5,777,991 A | * | 7/1998 | Adachi et al. | 370/352 |
| 5,793,843 A | * | 8/1998 | Morris | 455/553 |
| 5,894,595 A | * | 4/1999 | Foladare et al. | 455/556 |
| 5,974,044 A | * | 10/1999 | Ikeda et al. | 370/354 |
| 6,285,890 B1 | * | 9/2001 | Panian | 455/557 |

FOREIGN PATENT DOCUMENTS

| | | |
|---|---|---|
| GB | 2311911 | 10/1997 |
| JP | 10-98541 | 4/1998 |
| JP | 10-224861 | 8/1998 |
| WO | 9826621 | 6/1998 |

OTHER PUBLICATIONS

UK Office Action dated Feb. 25, 2000 in a related application.

Japanese Office Action issued Apr. 3, 2001, in a related application with English translation of relevant portions.

* cited by examiner

*Primary Examiner*—Dwayne Bost
*Assistant Examiner*—Quochien B. Vuong
(74) *Attorney, Agent, or Firm*—Dickstein, Shapiro, Morin & Oshinsky, L.L.P.

(57) ABSTRACT

Portable telephone capable of automatically receiving data without any operation to accept an incoming call by a user on an incoming call of data communication. The portable telephone comprises means for automatically identifying the communication mode on reception of an incoming call if the portable telephone is preset to an automatic receiving mode of the data communication, a plurality of communication control means each for one of a plurality of different communication modes, switching means for selecting any one of communication control means corresponding to the identified communication mode, and storing means for storing and saving received data. It informs the user the received data is stored at the data communication mode. The received and stored data is forwarded to an information processing terminal.

6 Claims, 7 Drawing Sheets

PORTABLE TELEPHONE

TECHNICAL FIELD

The present invention relates to a portable telephone, and in particular to a portable telephone for performing communication by automatically switching between a plurality of communication modes such as voice and data communication modes.

BACKGROUND OF THE INVENTION

For performing data communication by using a portable telephone or car telephone, an information processing terminal such as personal computer and an interface device such as modem (modulator and demodulator device) have been required in addition to the portable telephone. In this case, it is necessary to start up an application on the information processing terminal for enabling automatic reception of data by instructing from the information processing terminal.

Since the application which is started up on the information processing terminal includes various applications corresponding to communication modes such as facsimile, high speed data and packet communication mode, a presetting operation by the user is necessary.

A portable telephone which is capable of selecting communication modes between a facsimile communication mode which is performed between the portable telephone and an external facsimile device via a digital radio channel and a text data communication mode for forwarding an electronic mail between the portable telephone and an information processing device (for switching-over communication protocol and synchronization control) as well as the voice communication is disclosed in, for example, Japanese unexamined patent publication Kokai JP-A-10-98541.

SUMMARY OF THE DISCLOSURE

As mentioned above, the following problems occur when data communication is conducted by a prior art portable telephone.

A first problem resides in that an information processing terminal and an interface device such as modem (modulating and demodulating device) are additionally necessary for performing a data communication.

A second problem resides in that in order to enable the interface device to automatically receive data from the information processing terminal, an operation to start up the application corresponding to the communication mode on the side of the information processing terminal is necessary so that the presetting operation is complicated in order to cope with a plurality of different communication modes.

Accordingly, the present invention has been made in view of above mentioned problems. It is an object of the present invention to provide a portable telephone which is capable of automatically receiving data even if the user himself does not require to conduct an operation for accepting an incoming call on reception of the incoming call of the data communication.

In one aspect of the present invention there is provided a portable telephone characterized in that said telephone comprises means for automatically identifying the communication mode on reception of an incoming call if the portable telephone is preset to an automatic receiving mode of the data communication, a plurality of communication control means, each for one of a plurality of different communication modes, means for switching for selecting any one of communication control means corresponding to the identified communication mode, and storing means for storing and saving received data.

In a further aspect of the present invention, the portable telephone may include means for informing the user that the received data is stored in said storing means if the communication mode is the data communication mode other than the voice communication mode. The portable telephone may further includes means for forwarding said stored data to an information processing terminal.

PREFERRED EMBODIMENT OF THE INVENTION

Figure 1:
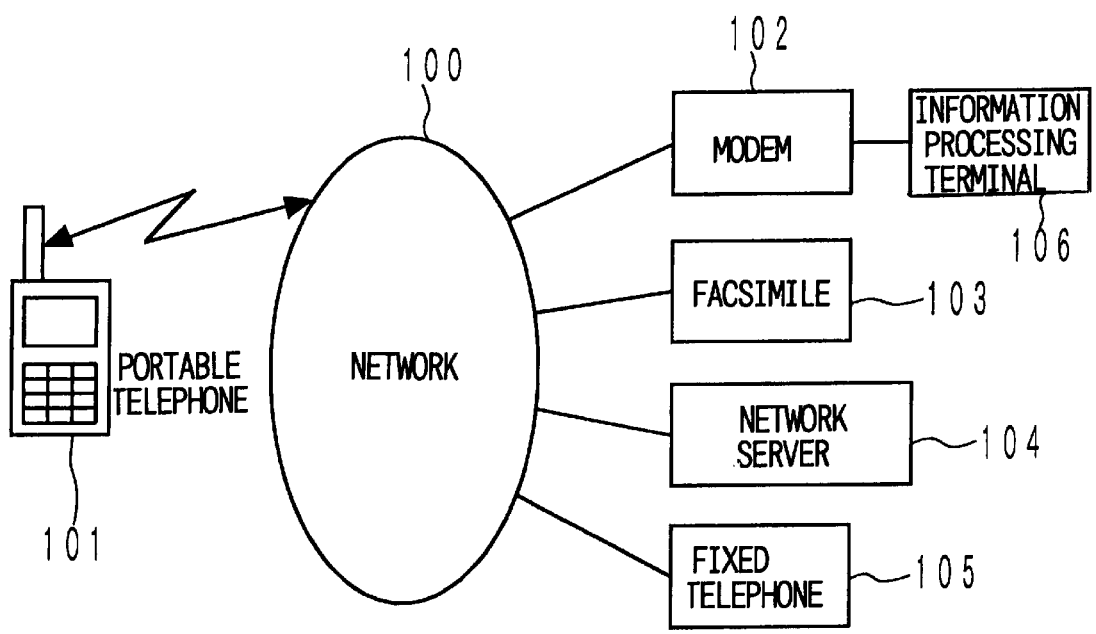
FIG. 1 is a diagram showing the configuration of a communication system to which the portable telephone of the present invention is applied.

A mode of embodying the present invention will be described. In FIG. 1, a portable telephone in a preferred mode of the present invention is configured to automatically identifying the mode of data communication such as facsimile, high speed data and packet communication modes if it is preset to an automatic receiving mode of the data communication, to store and save in a memory data which has been received by the data communication to the portable telephone, to display the presence of the received data on an display unit and to inform the user of the data reception.

The portable telephone is configured to upload the stored received data to the information processing terminal by a predetermined interface.

DETAILED DESCRIPTION OF THE EMBODIMENTS

Embodiments of the present invention will now be described with reference to the drawings. FIG. 1 is a schematic diagram showing the system configuration of one embodiment to which the portable telephone of the present invention is applied. Referring now to FIG. 1, a portable telephone 101 is wirelessly connected to a network (public switching telephone network PSTN or integrated service digital network ISDN and the like) 100, and can be connected to a fixed telephone 105, facsimile device 103, information processing terminal 106 such as personal computer and a network server 104 via the network 100. Various communication modes may include voice communication, facsimile communication, high speed data communication and packet communication modes which are established between the mobile (portable) telephone 101 and the fixed telephone 105, facsimile 103, information processing terminal 106 (via a MODEM 102) and network server 104, respectively.

Figure 2:
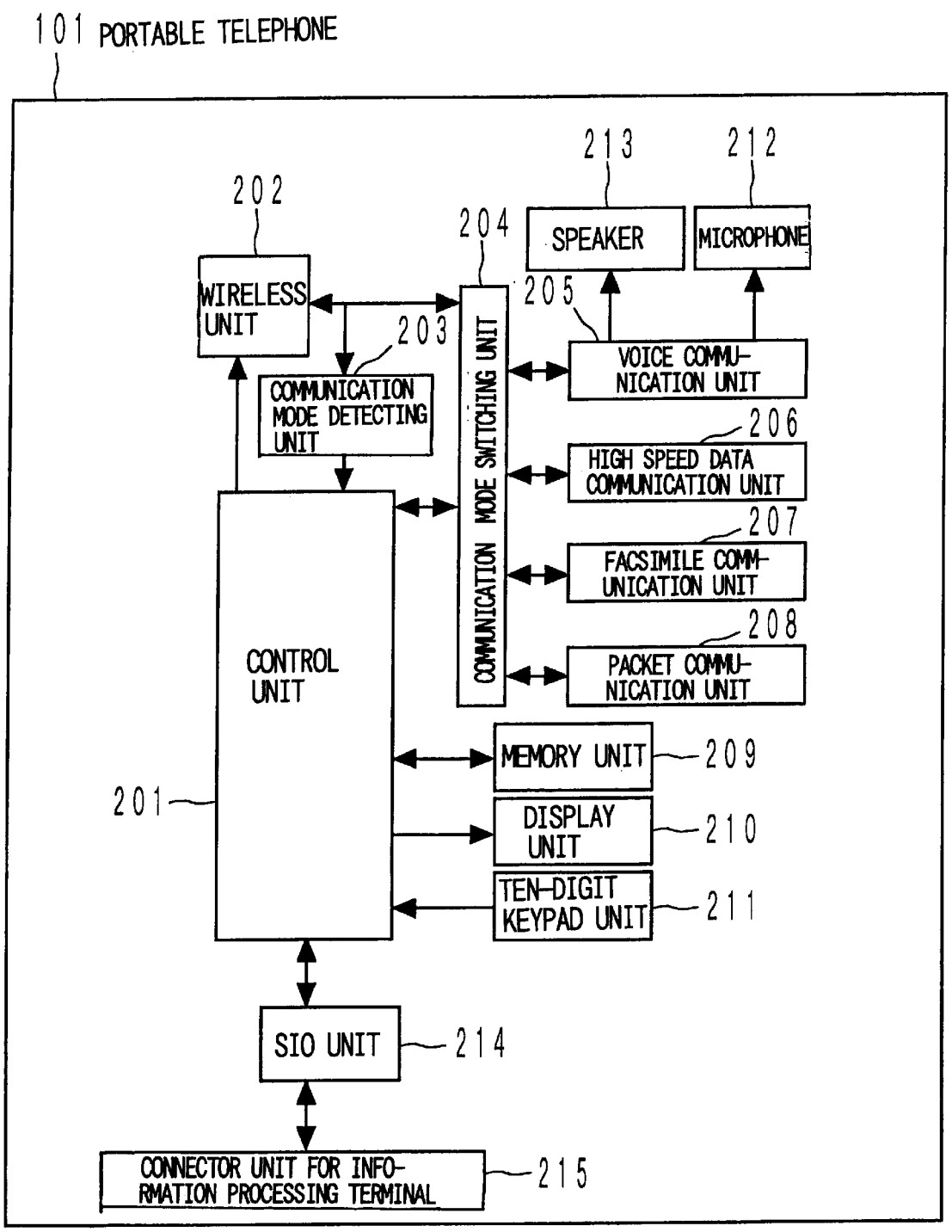
FIG. 2 is a brief block diagram showing the configuration of one embodiment of the portable telephone of the present invention.

FIG. 2 is a block diagram showing the configuration of one embodiment of the portable telephone of the present invention. Referring now to FIG. 2, the portable telephone 101 comprises a wireless unit 202 which can be wirelessly connected with the network 100, a communication mode detecting unit 203 for identifying the mode among the voice, facsimile, high speed data and packet communication modes on reception of an incoming call, a communication mode switching unit 204 for selecting a communication mode in accordance with the identified communication mode, a high speed data communication unit 206 for correspondingly conducting high speed data communication, a facsimile communication unit 207 for correspondingly conducting facsimile communication, a packet communication unit 208 for correspondingly conducting packet communication, a voice communication unit 205 for conducting voice communication, a speaker 213 and a microphone 212 which are used for voice communication, a display unit 210 for informing a user that data has been received by using the data communication, a memory unit 209 for storing the received data therein, a connector unit 215 for information terminal which is connected to an information processing terminal, an SIO unit (serial input/output unit) 214 for forwarding the stored data to the information processing terminal such as personal computer, a ten-digit keypad unit 211 for the entry of instructions when the user presets the function of the portable telephone 101 or makes a call, and a control unit 201 for controlling each of these units.

Figure 3:
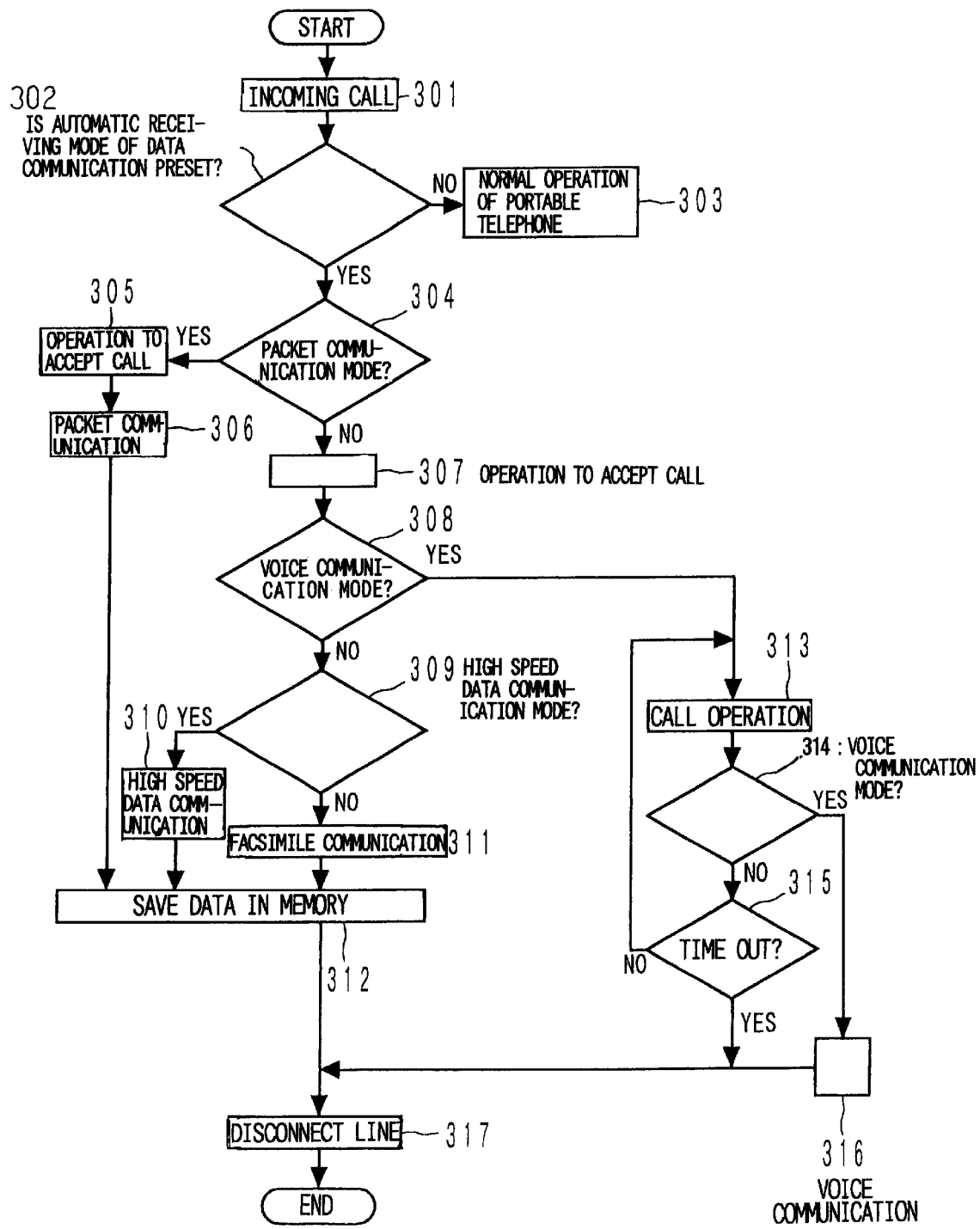
FIG. 3 is a flow chart showing the flow of operation in one embodiment of the portable telephone of the present invention.

FIG. 3 is a flow chart explaining the flow of processing in one embodiment of the portable telephone of the present invention. Operation in one embodiment of the present invention will be explained with reference to FIGS. 1 through 3.

It is assumed that there is an incoming call to the portable telephone 101 from any one of the information processing terminal 106 (MODEM 102), facsimile 103, network server 104 and the fixed telephone 105 via the network 100.

The portable telephone 101 receives the incoming call via the wireless unit 201 (step 301). After reception of the incoming call, the control unit 201 determines whether or not the user has preliminarily preset the automatic reception mode of the data communication by using the ten-key unit 211 (step 302). If the automatic reception mode has not been preset, usual call acceptance and reception is conducted in the portable telephone 101 (step 303).

If it is determined at step 302 that the automatic reception mode of the data communication has been preset, the communication mode detecting unit 203 determines whether or not the communication mode is a packet communication mode (step 304). If the communication mode is a packet communication mode, the incoming call is accepted (step 305). The communication mode is switched over to the packet communication mode by the communication mode switching unit 204 so that the packet communication is conducted by the packet communication unit 208 (step 306).

If it is determined at step 304 that the communication mode is not a packet communication mode, the incoming call is once accepted by the voice communication (step 307). After reception of the incoming call, the communication mode detecting unit 203 determines whether or not the communication mode is the voice communication mode (step 308). If the communication mode is the voice communication mode, a timer is started to count for alarming the user by ringing tone (step 313). On ringing, it is determined whether or not the user has depressed an answer button of the portable telephone for responding the call (step 314). If the user responds the call, voice communication is conducted by the voice communication response unit 205 (step 316). If there is no responding from the called user, it is determined whether the timer which has been initiated times out (step 315). If the timer does not time out, calling of the user is continued (step 313). If the timer times out while the telephone is under an on-hook condition, the line is disconnected (step 317).

If it is determined at step 308 that the communication mode is not the voice communication mode, the communication mode detecting unit 203 determines whether or not the communication mode is the high speed data communication mode (step 309). If the communication mode is the high speed data communication mode, the high speed data communication responding unit 206 is activated by the communication mode switching unit 204 so that the high speed data communication is conducted (step 310). If the communication mode is the facsimile communication, the facsimile communication responding unit 207 is activated for conducting the facsimile communication (step 311).

The data which has been received by any one of the packet, high speed data and facsimile communications is saved in the memory (step 312) and the line is disconnected (step 317).

After disconnection of the line, information on which mode of the communication which has been conducted is displayed on the display unit 210, for example, "one sheet of facsimile has been received" (step 318).

Thereafter, if the user uploads the data which has been received by the data communication into the information processing terminal such as personal computer, the user connects the information processing terminal to the connector 215 for the information processing terminal, of the portable telephone so that the data is transferred to the information processing terminal for uploading in a serial manner via the RS232C cable and the SIO unit 214.

The cable which is used for connecting the information processing terminal with the portable telephone may be a devoted cable other than the RS232C cable. Alternatively, e.g., ultra-red ray wireless communication may be used.

Figure 4:
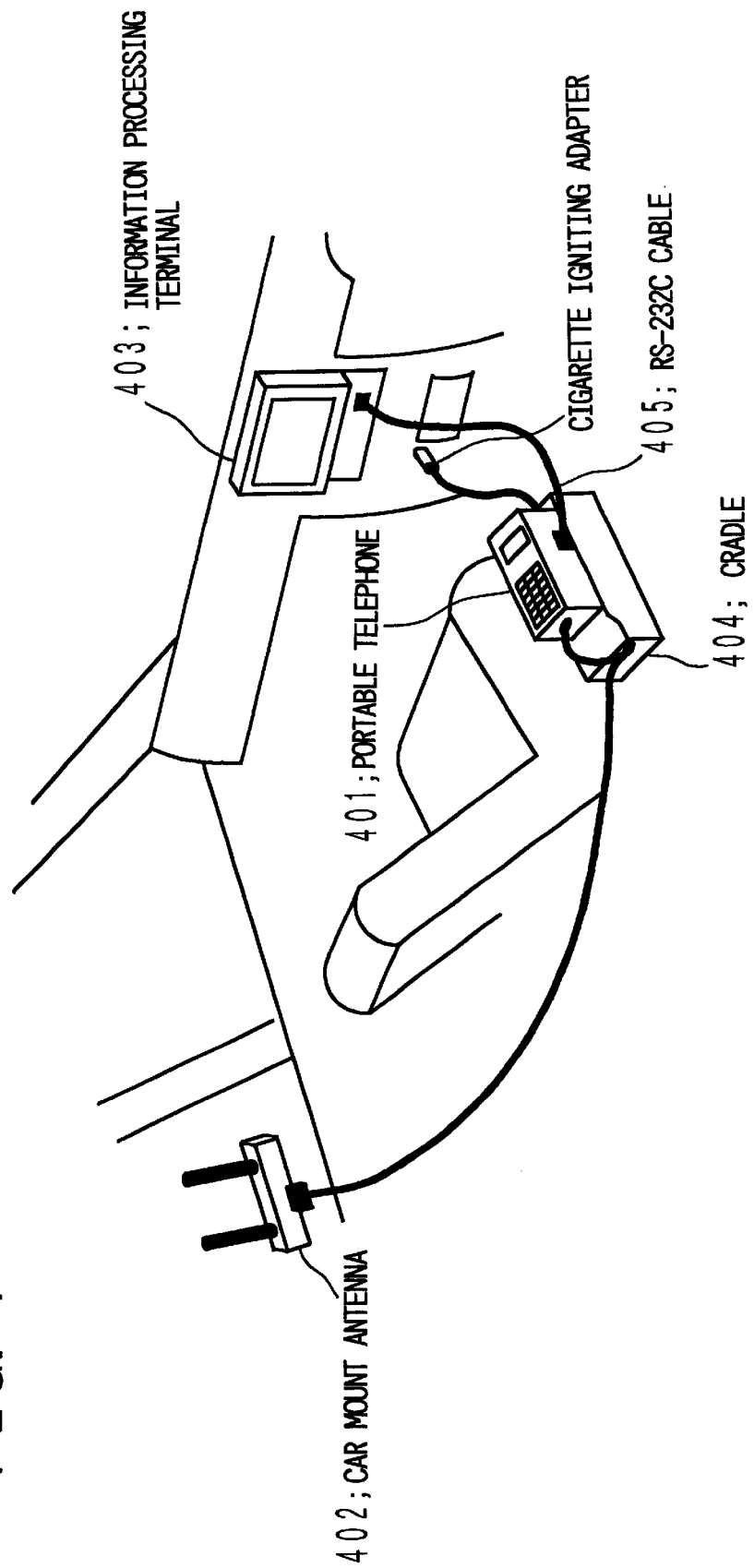
FIG. 4 is a schematic view showing an example of environment to which a second embodiment of the portable telephone of the present invention is applied.

A second embodiment of the present invention will be described. FIG. 4 is a schematic diagram explaining the second embodiment of the present invention. An example of the environment in which car telephone is used in an automobile is shown. The car telephone comprises a portable telephone 101, car-mounted antenna 402, information processing terminal 403 and a cradle 404 which retains the portable telephone 401. The car-mounted antenna 402 is connected to the cradle 404 through a connecting cable. The portable telephone 401 is connected to the cradle 404 so that the portable telephone 401 is powered from a cigarette igniting adapter through the cradle 404. The portable telephone 401 is connected to the information processing terminal 403 through the RS232C cable 405.

Figure 5:
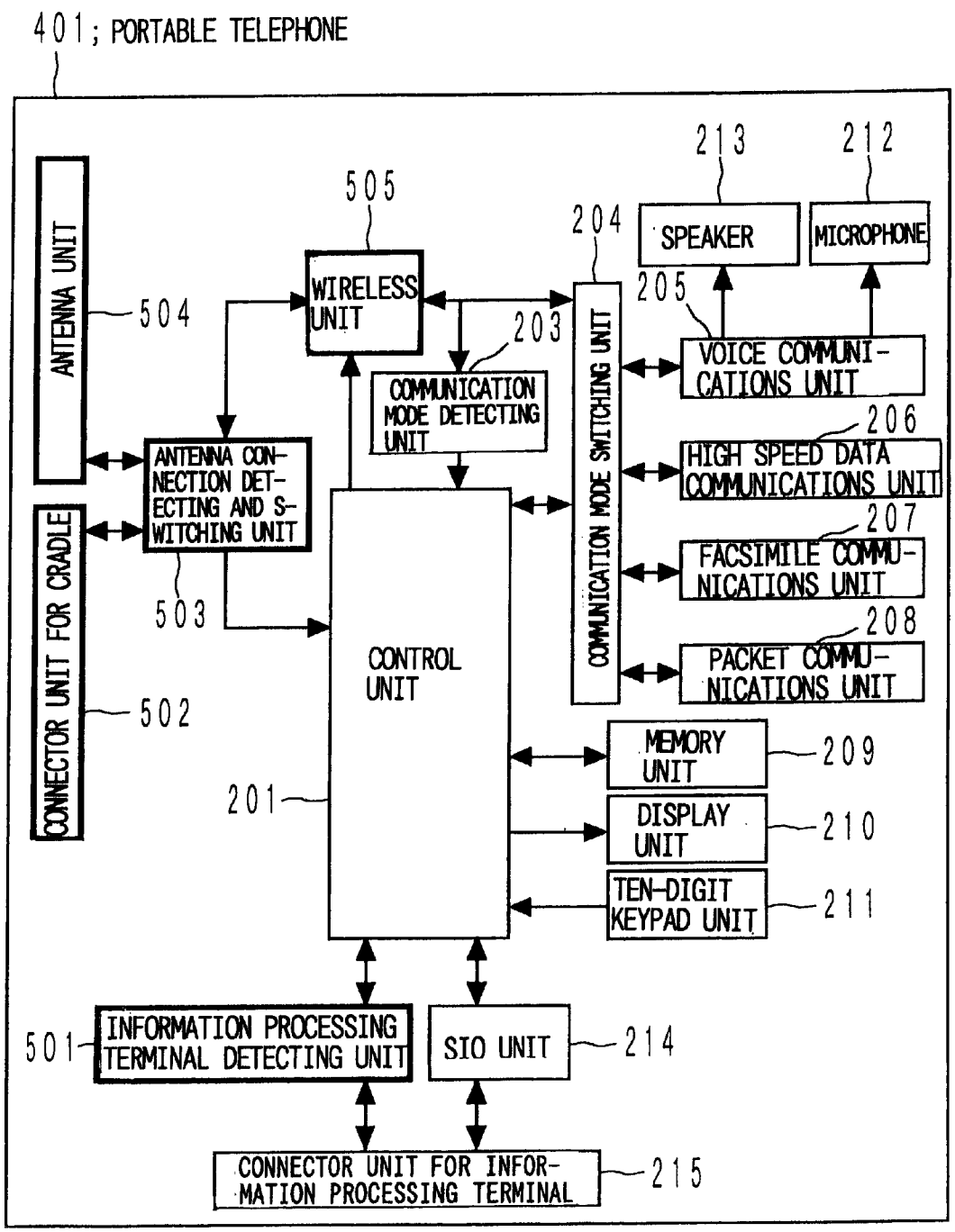
FIG. 5 is a schematic block diagram showing the configuration of the second embodiment of the portable telephone of the present invention.

FIG. 5 is a block diagram showing the configuration of the portable telephone 401 of a second embodiment of the present invention. In FIG. 5, components which are identical or equivalent to those in FIG. 2 are designated with identical reference numerals, whereas the blocks with thick solid line denotes components added to those shown in FIG. 2. Referring now to FIG. 5, the portable telephone 401 of the second embodiment of the present invention comprises a information processing terminal detecting unit 501, a connector 502 for the cradle, and an antenna connection detecting and switching unit 503 in addition to the components of the portable telephone of the aforementioned embodiment which is shown in FIG. 2.

As shown in FIG. 5, the wireless unit 202 which is shown in FIG. 2 comprises an antenna 504 and a wireless unit 505.

Figure 6:
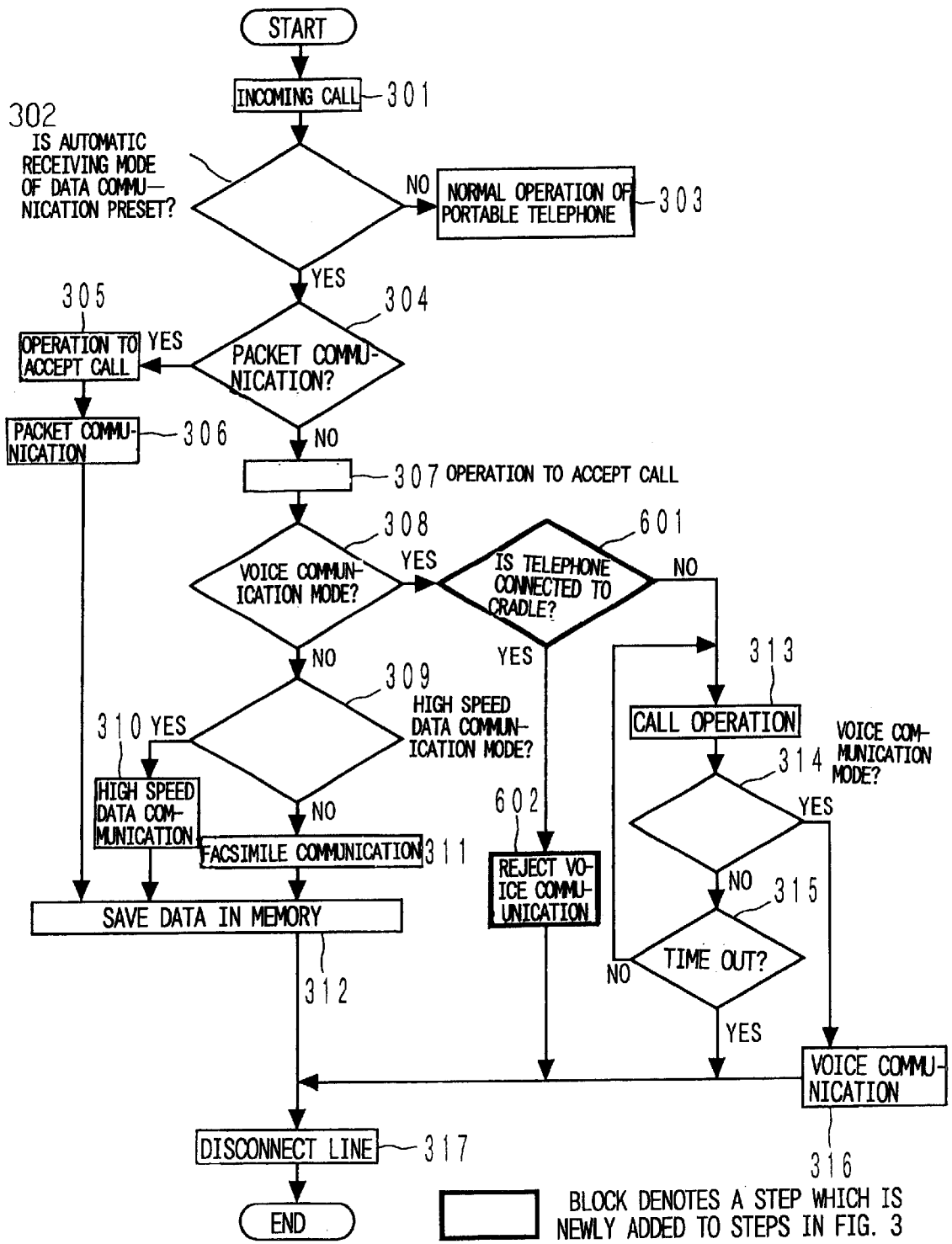
FIG. 6 is a flow chart showing the flow of operation in the second embodiment of the portable telephone of the present invention.

FIG. 6 is a flow chart showing the processing flow in the second embodiment of the present invention. In FIG. 6, operations which are identical with those in the flow chart of FIG. 3 are represented by the same step numbers. Referring now to FIG. 6, in the second embodiment of the present invention, operation for determining whether or not the portable telephone 401 is connected to the cradle 404 in case of voice communication mode (step 601) and operation for rejecting the voice communication if the portable telephone is connected to the cradle (step 602) are added to those in the flow chart of FIG. 3. With reference to FIGS. 5 and 6, differences between the operations in the second and the first embodiment of the present invention will be described.

It is assumed that the user has preset the automatic reception mode of the data communication for the portable telephone 401 and is driving his or her car. When an incoming call is received by the portable telephone 401 and the communication mode is a voice communication mode, the antenna connection detecting and switching unit 503 detects that the portable telephone 401 is connected to the cradle 404 and the user is in the automobile (step 601). A voice message "Called person cannot answer because now driving," is announced to the caller, rejecting the voice communication (step 602), and the line is disconnected.

If the communication mode is not the voice communication mode, but the data communication mode at step 308, reception in the data communication is automatically connected as mentioned in the foregoing embodiment.

Figure 7:
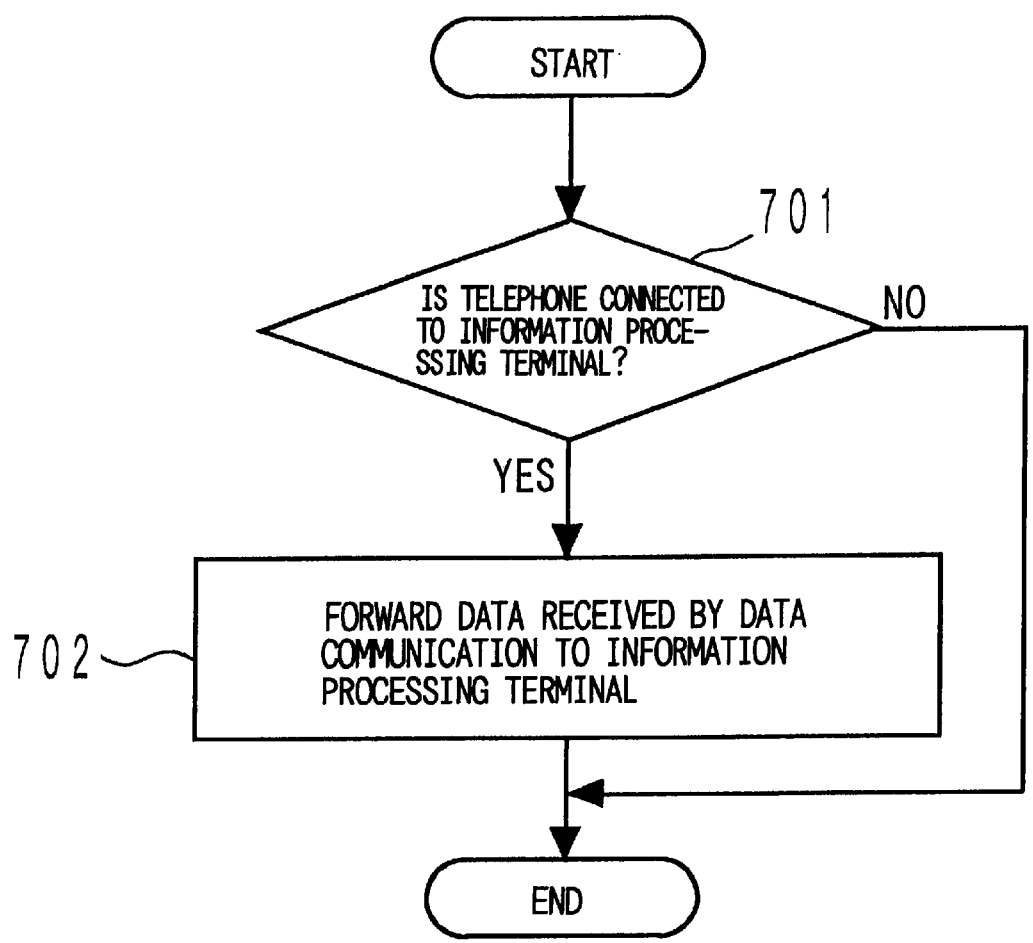
FIG. 7 is a flow chart showing the flow of operation in the second embodiment of the portable telephone of the present invention.

FIG. 7 is a flow chart showing the operation after disconnection of the line in the second embodiment of the present invention. Data communication is conducted in the portable telephone 401. If the portable telephone 401 is connected to the information processing terminal 403 through the RS232C cable 405 after the disconnection of the line, a determination is made as to whether or not forwarding of the data to the information processing terminal 403 is possible by the information processing terminal detecting unit 501 detecting a terminal ready signal (step 701). If the forwarding of the data is possible, data is forwarded to the information processing terminal 403 (step 702). If the forwarding of the data is not possible, the data as received is stored in the memory unit 209 of the portable telephone 401.

Effects of the present invent ion are again summarized as follows.

As mentioned above, in accordance with the present invention, if a call for data communication is incoming to the portable telephone, receiving in the data communication can be automatically conducted without any necessity of the user himself answering the call by the user preliminarily presetting the automatic reception for the data communication in the portable telephone. This advantageously enhances ease of operation, convenience and utilization of the portable telephone.

Since the received data can be forwarded to the information processing terminal as a file after completion of the data communication by the portable telephone in accordance with the present invention, intensive selection between applications in the information processing terminal is not required, improving ease of operation.

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A car-mounted type portable telephone, comprising:
   means for automatically identifying a communication mode on reception of an incoming call if the portable telephone is preset to an automatic receiving communication mode;
   a plurality of communication control means each for one of a plurality of different communication modes;
   switching means for selecting any one of communication control means corresponding to the identified communication mode;
   storing means for storing and saving received data; and
   control means for automatically rejecting a call establishment on reception of a voice call if the incoming call is a voice communication mode while the telephone is connected to a cradle.

2. A car-mounted type portable telephone as defined in claim 1, further comprising means for informing the user that the received data is stored in said storing means if the communication mode is a data communication mode other than a voice communication mode.

3. A car-mounted type portable telephone as defined in claim 2, further comprising means for forwarding the received data which has been stored in said storing means to an information processing terminal.

4. A car-mounted type portable telephone as defined in claim 1, further comprising means for forwarding the received data which has been stored in said storing means to an information processing terminal.

5. A car-mounted type portable telephone as defined in claim 1, wherein a data communication other than a voice communication mode includes packet, facsimile and high speed data communication modes which are performed between said portable telephone and an external device via a network to which said telephone is wirelessly connected.

6. A portable telephone which is used as a car telephone, the portable telephone, comprising:
   communication mode detecting means for identifying which mode among modes of voice, facsimile and data communication including packet communication is established on reception of an incoming call;
   data communication means for performing communication in a data communication mode;
   facsimile communication means for performing a communication in a facsimile communication mode;
   voice communication means for performing a communication in a voice communication mode;

communication mode switching means for automatically selecting any one of communication modes to be performed by said data, facsimile and voice communications means in accordance with the communication mode which is identified by the communication mode detecting means;

means for informing the user of the portable telephone that the data has been received by using facsimile or data communication mode other than the voice communication;

storing means for storing the received data;

information forwarding means for forwarding said received data to an information processing terminal; and control means for automatically rejecting call establishment on reception of a voice call if the incoming call is the voice communication while the telephone is connected to a cradle.

\* \* \* \* \*